July 8, 1930.   W. F. BUCKINGHAM   1,770,227
DISPLAY DEVICE
Filed Feb. 18, 1926   4 Sheets-Sheet 1
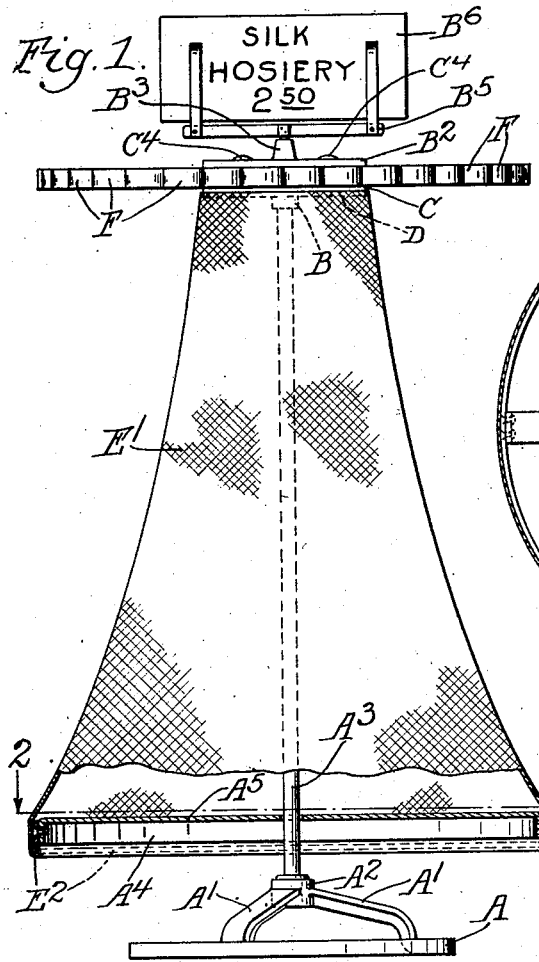
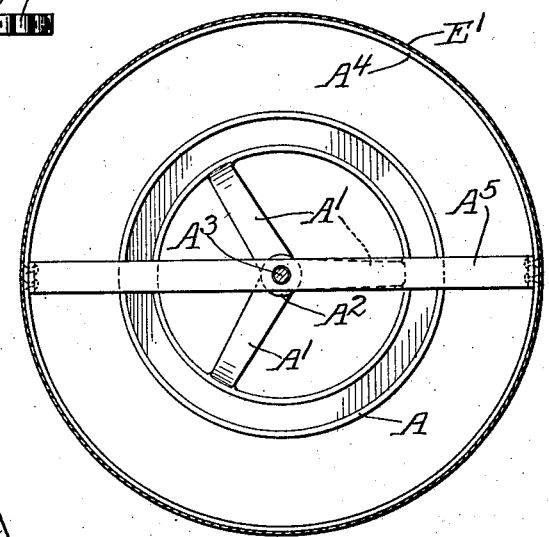
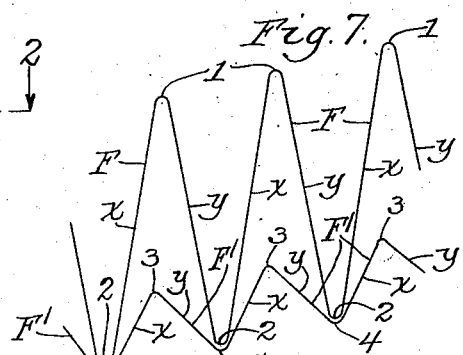
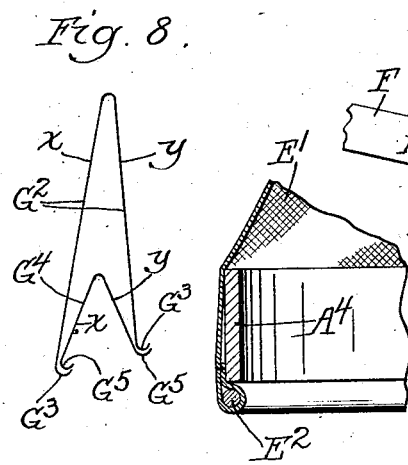
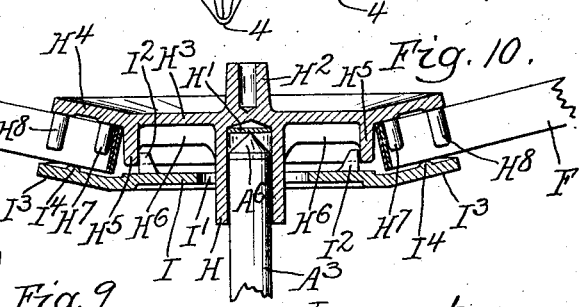
Inventor.
William F. Buckingham
by Parker & Carter
Attorneys.

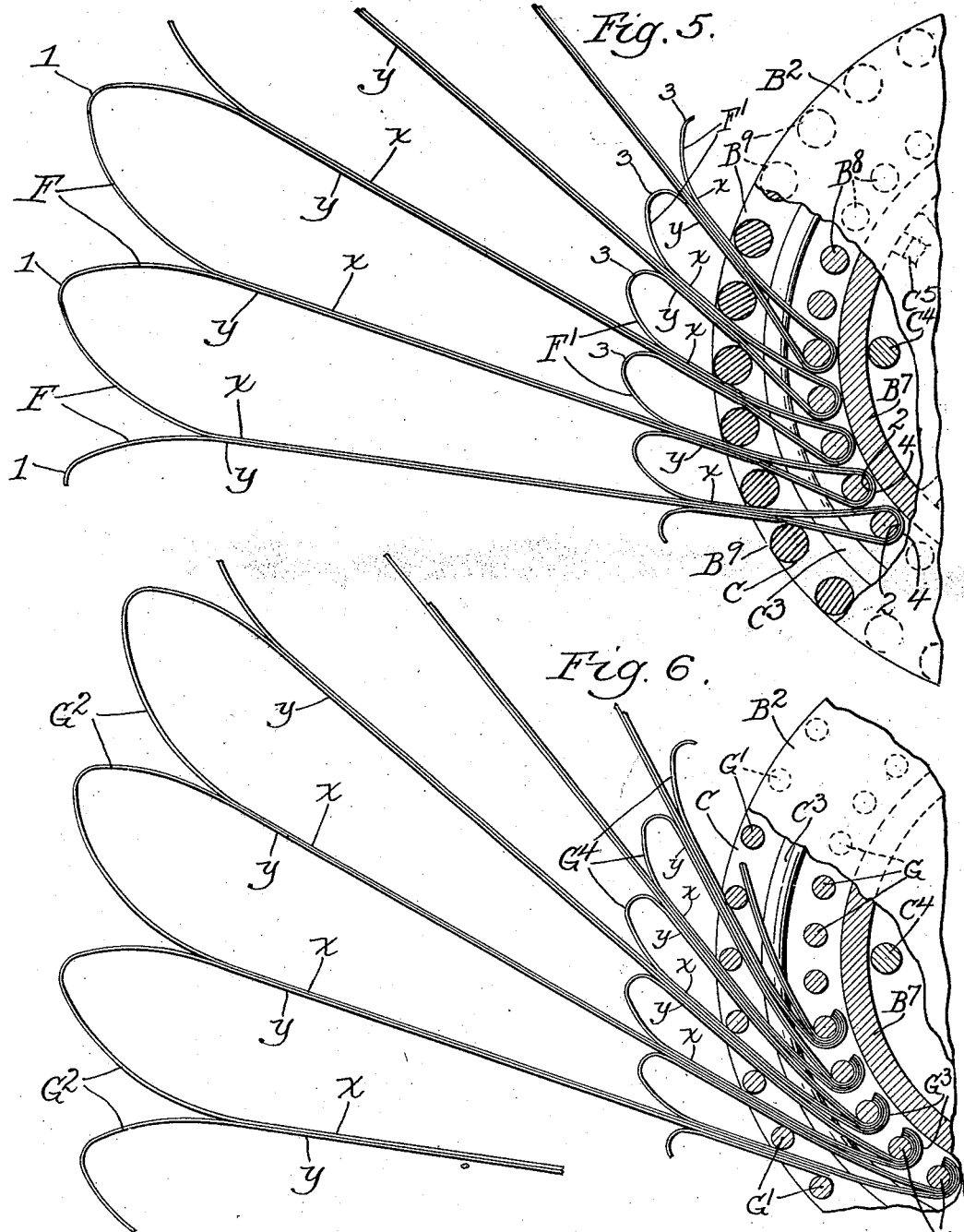

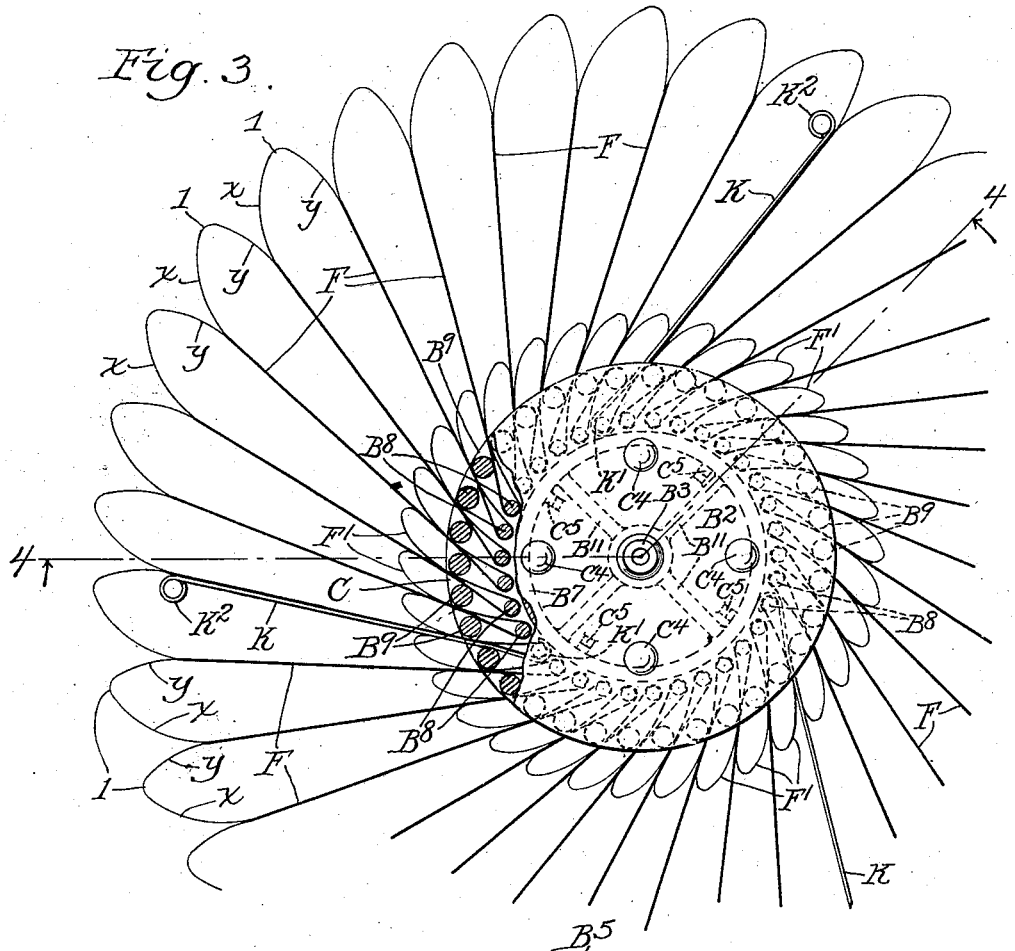
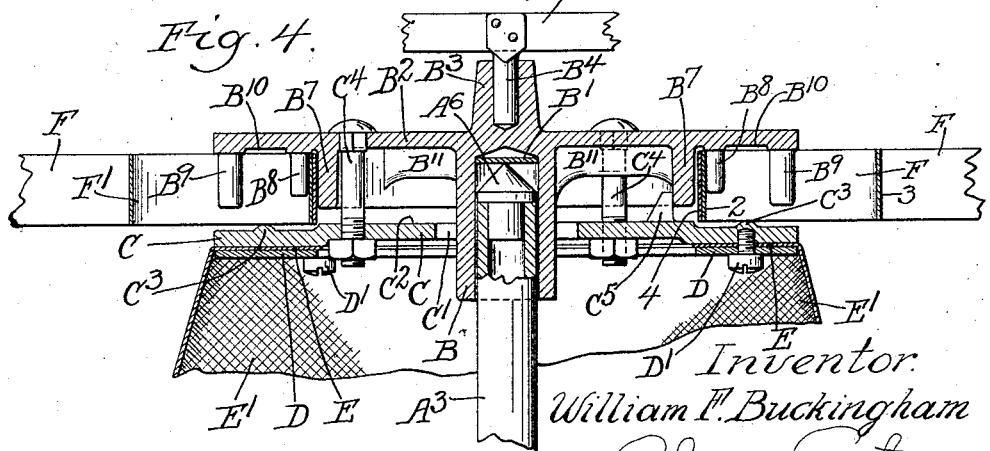

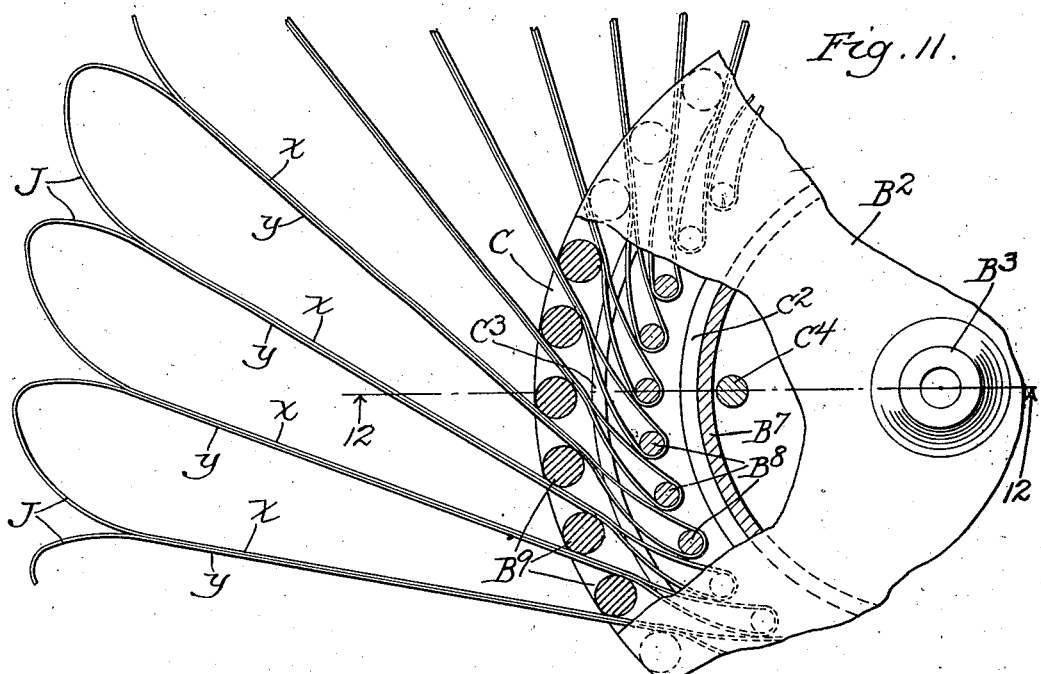
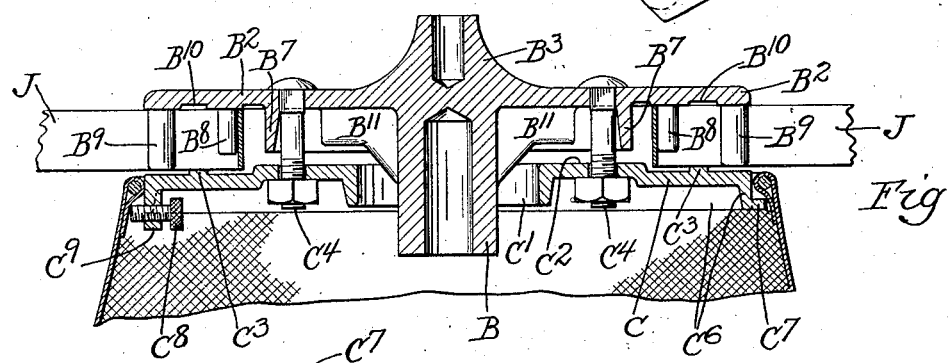
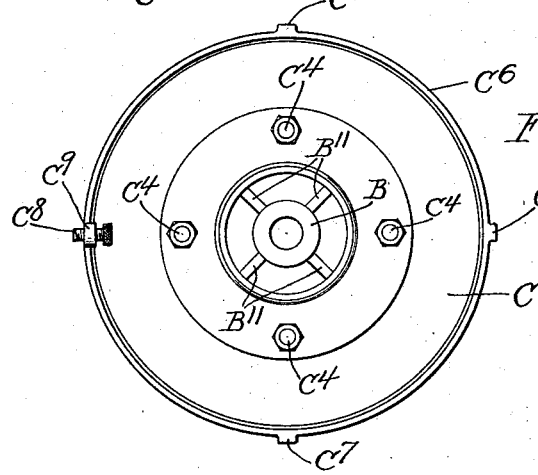

Patented July 8, 1930

1,770,227

UNITED STATES PATENT OFFICE

WILLIAM F. BUCKINGHAM, OF CHICAGO, ILLINOIS

DISPLAY DEVICE

Application filed February 18, 1926. Serial No. 89,039.

This invention relates to a display device, and particularly to a display device for displaying hosiery or other elongated articles. It has for one object to provide an apparatus by means of which a number of hose may be readily displayed in a very small space and by means of which a considerable portion of it may be displayed. Other objects will appear from time to time throughout the specification and claims.

My invention is illustrated more or less diagrammatically in the accompanying drawings, wherein:

Figure 1 is a side elevation with parts broken away showing the device in position for use;

Figure 2 is a cross section taken on line 2—2 of Figure 1;

Figure 3 is a top plan view with parts broken away and parts in section;

Figure 4 is a cross section taken on line 4—4 of Figure 3 on an enlarged scale showing the top parts of the device;

Figure 5 is a fragmentary plan view with parts on an enlarged scale, parts broken away showing in detail the mounting of the supporting members;

Figure 6 is a view similar to Figure 5 showing a modified form;

Figure 7 is a diagrammatic view showing the folding or bending of the supporting members of the form of Figure 5 before they are inserted and held in place;

Figure 8 is a view similar to Figure 7 showing the form of supporting members as used in Figure 6;

Figure 9 is a detail on an enlarged scale showing a part of the bottom of the display skirt;

Figure 10 is a fragmentary vertical section showing a modified form of the supporting plates;

Figure 11 is a view similar to Figures 5 and 6 showing a further modification in which the upper supporting members are formed continuously from a single piece;

Figure 12 is a vertical cross section taken on the line 12—12 of Figure 11 showing the upper end of the form of the device shown in that figure;

Figure 13 is an inverted plan view of the lower plate of the supporting member.

Like parts are indicated by like characters throughout.

A is a base formed preferably of an annular ring having a channeled upper surface. It is provided with a plurality of converging arms $A^1$ which join to form a hub or socket $A^2$ within which is positioned a central supporting rod $A^3$. About the lower end of the rod $A^3$ is a hoop $A^4$ provided with a cross member $A^5$ which is perforated adjacent its center and at that point surrounds the central shaft $A^3$. It is supported from the upper part of the display device in the manner to be described later. $A^6$ is a conical point mounted in the upper end of the rod, tube or shaft $A^3$.

B is a hub positioned about the upper end of the rod $A^3$ provided with a bearing plate $B^1$ which rests upon the point of the conical member $A^6$. Formed preferably integral with the hub B is a laterally extending disc or plate $B^2$. Extending upwardly from the plate is the socket portion $B^3$ adapted to receive a pin $B^4$ from a card frame $B^5$ within which a display card $B^6$ may be positioned. The plate or disc $B^2$ is provided on its under side with a downwardly depending annular flange $B^7$, and a row of short downwardly depending pins $B^8$, and adjacent its periphery a row of larger downwardly depending pins $B^9$. The pins in adjacent rows are preferably arranged radially. Adjacent the rows of pins there is provided as shown an annular depression $B^{10}$. On the under surface of the disc $B^2$ and joining the hub portion with the flange $B^7$ is a plurality of reinforcing webs $B^{11}$.

Beneath the plate or disc $B^2$ is provided a second disc C. It is provided with the central perforation $C^1$ preferably larger than the hub B and therefore out of contact with it. Its inner portion is somewhat higher than its outer portion as at $C^2$, and extending upwardly from this outer portion is a raised bead $C^3$. It is removably joined to the upper plate $B^2$ by means of bolts $C^4$. $C^5$ are spacing lugs on the upper surface of the disc C adapted to contact the inner surface of the flange $B^7$ to center the two discs with relation to each other.

D is an annulus adapted to be attached removably to the bottom of the plate C by means of the screws $D^1$. Between it and the plate C is engaged the upper edge E of the display skirt $E^1$ which is preferably made of some flexible fabric, cloth, netting or any other suitable material. The lower edge of the skirt $E^1$ is turned inwardly to form a pocket and within this pocket is positioned a reinforcing and strengthening member $B^2$ made up of cord or some other suitable material.

F is the outer or main display member. It is preferably formed of flat spring wire, and in the form shown in Figures 1 to 5 inclusive and Figure 7 this wire is continuous, and thus a single wire is folded back and forth upon itself and positioned about the display device throughout its circumference. This wire is folded as shown in a plurality of folds, each fold having a long side $x$ and a shorter side $y$. The folds are then positioned about the pins $B^8$ and $B^9$ between the two plates $B^2$ and C.

As shown in Figure 7 the wire is folded having the long portion "$x$" and the short portion "$y$" for each fold, and each fold having an outer end "1" and an inner end "2". The inner end "2" is positioned about one of the inner pins $B^8$ and passes between two of the outer pins $B^9$. It contacts, however, not the pins $B^9$ which is radial with respect to the pins $B^8$ about which it is positioned, but it contacts the next pin and thus it extends not radially but tangentially. Thus each of the ends "2" is positioned about one of the pins $B^8$, the wire is folded over and bears against an offset pin $B^9$ and by reason of this arrangement and by reason of the fact that the side "$x$" of each of the folds is longer than the side "$y$", the folds are when in position not symmetrical but take the form shown in the drawing.

To assist this feature and to strengthen the members and support them, a second wire $F^1$ is used. This wire is folded just as the first wire F is folded, each of the folds being smaller. It also has a long portion "$x$" and a short portion "$y$", outer point "3" and an inner point "4". It is arranged so that it embraces the wire F at its inner end. Thus it tends additionally to throw it out of the symmetrical and radial position and to force it tangentially into the position and form shown in the drawing.

Figure 6 shows a slightly modified form. The pins there shown in the plate $B^2$ are not arranged radially, as is the case in the earlier shown forms of the device. The disc $B^2$ is provided with an inner row of pins G and an outer row of pins $G^1$. In this form of the device the spring parts are not continuous, each of the outer loops being formed of a single member $G^2$ provided with a long portion "$x$" and short portion "$y$" and at its inner end with a hook $G^3$. In combination with this spring section $G^2$ is an additional section $G^4$ provided with a long portion, "$x$", a short portion "$y$" and a pair of hooks $G^5$ at its inner end.

In mounting the spring sections $G^2$ and $G^4$ about the pins and between the plates, one of each of such sections is collapsed together so that the two pairs of hook members $G^3$ and $G^5$ are within each other and are positioned about the pin G. They extend generally tangentially outward and embrace one of the pins $G^1$, preferably the one next, going in a circle in a counter clockwise direction. In this manner the two spring sections co-operate to provide a strong and resilient structure, and the inner section reinforcing the outer section additionally accentuating the tangential bending.

In the form shown in Figure 10 a hub H surrounds the rod $A^3$. It is provided with a bearing part $H^1$ and a socket portion $H^2$ and a laterally extending plate or disc $H^3$ provided with an upwardly flaring outer edge $H^4$. It has beneath it and extending downwardly from it an annular flange $H^5$ provided with reinforcing webs $H^6$ and a row of pins $H^7$, extending downwardly from the upwardly flaring portion $H^4$, and a second row of pins $H^8$, the two being separated by a groove or depression as shown in Fig. 10.

In co-operation with this plate $H^3$ is a second plate I provided with a perforation $I^1$ greater in diameter than the hub portion H so as to be out of contact with it, and provided with spacing lugs $I^2$ which contact the inner surface of the flange $H^5$ and center the discs. It is also provided with an upwardly flaring portion $I^3$ carrying in its upper surface a bead $I^4$. The two plates are fastened together in the manner described above in connection with the other forms of the device.

K is a card displaying member provided with an inner loop $K^1$ adapted to be positioned about one of the pins $B^8$ to extend outwardly and contact the pin $B^9$, and it is provided with a socket portion $K^2$. By means of this device a plurality of card holding members may be inserted within the display device, and thus several different cards may be used in connection therewith.

In the form of the device shown in Figures 11, 12 and 13 the upper plate $B^2$ is the same as that shown in Figures 1, 2, 3 and 4 and the lower plate is generally the same as those shown in those figures. It is provided, however with additional downwardly depending outer edge $C^6$ which carries at suitable intervals about its edge a plurality of outwardly extending lugs or points $C^7$. An adjustable thumb nut $C^8$ is mounted in a threaded perforated member $C^9$.

In the form shown in Figures 11 and 12 the outer spring member is essentially the same as that shown in Figure 3 except that it is a single member without any supporting feature. In this form a length of flat spring wire J is wound in and out about the pins, an inner end at one end passing about a pin $B^8$ and outwardly about the second pin from it, counting in a clockwise direction. Each of the folds is provided with a long side "$x$" and a short side "$y$" described in connection with the other forms. Thus due to this shaping and winding of the wire, the separate folds are non-symmetrical and they slant off in a generally tangential direction.

Although I have shown an operative device, still it will be obvious that many changes might be made in size, shape and arrangement or parts without departing materially from the spirit of my invention; and I wish, therefore, that my showing be taken as in a sense diagrammatic.

The use and operation of my invention are as follows:

The device is assembled in any one of the several forms, and in that form when it is to be used, articles to be displayed are draped upon the spring loops, being slipped between them and hanging downwardly from them. Thus they are held firmly against accidental displacement, a small distance each from the other, so that a large portion of each can be seen and so that a large number may be arranged in a very limited amount of space. The device may be stationary or it may be rotated by hand or mechanically.

I claim:

1. In a display device, a goods supporting member comprising a plurality of fingers arranged generally in the form of a circle and mounted for relative movement and normally in contact with each other, each of said fingers having two sides, a long and a short side, and being positioned within the circle and inclined to a radius where the end of the finger touches the circle, said fingers being adapted to be separated one from another for the insertion of articles to be displayed.

2. In a display device, a goods supporting member comprising a plurality of fingers arranged generally in the form of a circle and mounted for relative movement and normally in contact with each other, each of said fingers having two sides, a long and a short side, and being positioned within the circle and inclined to a radius where the end of the finger touches the circle, said fingers being adapted to be separated one from another for the insertion of articles to be displayed, each finger having a reinforcing and shaping member within it.

3. In a display device, a goods supporting member comprising a plurality of fingers arranged generally in a circular form mounted for relative movement, formed of yielding material and normally in contact with each other, each of said fingers having two sides, a long and a short side, and being positioned within the circumference of said circular form and inclined to the radii thereof, said fingers being adapted to be separated one from another for the insertion of articles to be displayed, each finger having a reinforcing and shaping member within it of smaller size than and corresponding to it in shape.

4. In a display device, a laterally extended supporting member formed of a plurality of spring folds, each fold being in contact with the ones adjacent to it, each fold being supported at one end and provided with a short side and a long side whereby it is laterally bent and distorted, the supporting member being generally circular in configuration and the folds being inclined to the radii of said supporting member.

5. In a display device, a laterally extended supporting member formed of a plurality of spring folds, each fold being in contact with the ones adjacent to it, each fold being supported at one end and provided with a short side and a long side whereby it is laterally bent and distorted, in combination with a second series of spring folds of a similar shape and smaller size, the supporting member being generally circular in configuration and the folds being inclined to the radii of said supporting member.

6. In combination, plates, means for drawing them together, the plates having on their adjacent faces projections, one having a plurality of pins, and a supporting element held between said plates and extending therefrom, said element formed of a plurality of folds of material, each of said folds at one end being engaged about such pins and positioned so as to enclose another, each fold being provided with a long side and a short side whereby the same is bent and distorted laterally.

7. In combination, plates, means for drawing them together, the plates having on their adjacent faces projections, one having a plurality of rows of pins, and a supporting element held between said plates and extending therefrom, said element being formed of a plurality of folds of material, each of said folds at one end being engaged about two of such pins and positioned so as to enclose another, each fold being provided with a long side and a short side whereby the same is bent and distorted laterally.

8. In combination, plates, means for drawing them together, the plates having on their adjacent faces projections, one having a plurality of rows of pins, and a supporting element held between said plates and extending therefrom, said element being formed of a plurality of folds of spring material, each of said folds at one end being engaged about two of such pins and positioned so as to enclose another, each fold being provided with a long side and a short side whereby the same is bent and distorted laterally, in combination with a second series of spring folds of the same general shape as the first series, of smaller size and engaged about said pins.

9. In combination, plates, means for drawing them together, the plates having on their adjacent faces projections, one having a plurality of rows of pins, and a supporting element held between said plates and extending therefrom, said element being formed of a plurality of folds of spring material, each of said folds at one end being engaged about two of such pins and positioned so as to enclose another, each fold being provided with a long side and a short side whereby the same is bent and distorted laterally, in combination with a second series of spring folds of the same general shape as the first series and smaller size than the same, one fold of such second series being disposed within each of said first series of folds and positioned about the same pins.

10. A display device including in combination a supporting member and a laterally disposed supporting member supported thereon, said laterally disposed member being formed of a pair of co-operating plates, and a laterally disposed member formed of a plurality of folds of material, said folds being at one end engaged about said projections and each having a short side and a long side whereby they are disposed laterally away, from a radial position, and means for drawing the two plates together to lock the laterally disposed member in position.

11. A display device comprising a flat circular supporting base, a plurality of members projecting therefrom, a plurality of spring fingers carried by the base and formed from a single continuous thin flat spring strip, the fingers being formed from successive loops, the inner ends of the loops engaging the projections on the base, the outer ends of the loops projecting in a horizontal plane from the base in a direction inclined to the radius of said supporting base.

12. A display device comprising a flat circular supporting base, a plurality of members projecting therefrom, a plurality of spring fingers carried by the base and formed from a single continuous thin flat spring strip, the fingers being formed from successive loops, the inner ends of the loops engaging the projections on the base, the outer ends of the loops projecting in a horizontal plane from the base in a direction inclined to the radius of said supporting base, and means overlying the base and projections for holding the fingers in place on the base in interlocked relation with the projections.

Signed at Chicago, county of Cook and State of Illinois, this 16th day of February, 1926.

WILLIAM F. BUCKINGHAM.